United States Patent
Glotzbach et al.

(10) Patent No.: US 12,430,718 B2
(45) Date of Patent: Sep. 30, 2025

(54) SYSTEM AND METHOD FOR NOISE REDUCTION FOR BLENDING BLURRED FRAMES IN A MULTI-FRAME SYSTEM

(71) Applicant: Samsung Electronics Co., Ltd., Suwon-si (KR)

(72) Inventors: John Glotzbach, Allen, TX (US); Zhen Tong, Allen, TX (US); Hamid R. Sheikh, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 407 days.

(21) Appl. No.: 17/587,521

(22) Filed: Jan. 28, 2022

(65) Prior Publication Data
US 2023/0237623 A1   Jul. 27, 2023

Related U.S. Application Data

(60) Provisional application No. 63/302,359, filed on Jan. 24, 2022.

(51) Int. Cl.
*G06T 5/70* (2024.01)
*G06T 5/50* (2006.01)

(52) U.S. Cl.
CPC .......... *G06T 5/70* (2024.01); *G06T 5/50* (2013.01); *G06T 2207/20192* (2013.01)

(58) Field of Classification Search
None
See application file for complete search history.

(56) References Cited

U.S. PATENT DOCUMENTS

| | | | |
|---|---|---|---|
| 8,532,421 B2* | 9/2013 | Wang | G06T 5/73 382/255 |
| 9,237,257 B1 | 1/2016 | Szedo et al. | |
| 9,998,666 B2 | 6/2018 | Sapiro et al. | |
| 10,742,892 B1* | 8/2020 | Le | H04N 23/741 |
| 2008/0226179 A1* | 9/2008 | Dohta | G06T 15/503 382/232 |

(Continued)

FOREIGN PATENT DOCUMENTS

| | | |
|---|---|---|
| KR | 10-2013-0013288 A | 2/2013 |
| KR | 10-2014-0104806 A | 8/2014 |
| KR | 10-2015-0132605 A | 11/2015 |

OTHER PUBLICATIONS

Ixa. "Answer to 'Detect Which Image Is Sharper." Stack Overflow, Jul. 11, 2011, https://stackoverflow.com/a/6648182. (Year: 2011).*

(Continued)

*Primary Examiner* — Matthew C Bella
*Assistant Examiner* — Johnny B Duong (57) ABSTRACT

A system and method are provided for noise reduction improvement for blending blurred frames in a multi-frame system. The method includes retrieving a number of frames of an image. The method also includes identifying one or more edges within the frames and comparing an edge strength of a reference frame and an edge strength of a non-reference frame. The method further includes determining a weight reduction factor based on a result of the comparison and applying the weight reduction factor to a blending of multiple frames of the number of frames of the image. In addition, the method includes displaying the blended frames.

20 Claims, 8 Drawing Sheets

(56) References Cited

U.S. PATENT DOCUMENTS

| | | | |
|---|---|---|---|
| 2010/0104202 A1* | 4/2010 | Chen | H04N 5/21 |
| | | | 382/218 |
| 2013/0028509 A1 | 1/2013 | Moon et al. | |
| 2014/0232904 A1 | 8/2014 | Na et al. | |
| 2014/0307044 A1 | 10/2014 | Sharma et al. | |
| 2017/0064204 A1 | 3/2017 | Sapiro et al. | |
| 2018/0095342 A1 | 4/2018 | Mogami | |
| 2020/0265567 A1 | 8/2020 | Hu et al. | |
| 2020/0357102 A1* | 11/2020 | Pekkucuksen | H04N 23/73 |
| 2022/0138909 A1* | 5/2022 | Nayak | G06T 5/50 |
| | | | 382/255 |

OTHER PUBLICATIONS

Nimisha, T. M., A. N. Rajagopalan, and Rangarajan Aravind. "Generating high quality pan-shots from motion blurred videos." Computer Vision and Image Understanding 171 (2018): 20-33. (Year: 2018).*

Jiang, Wei, and Jinwei Gu. "Video stitching with spatial-temporal content-preserving warping." Proceedings of the IEEE conference on computer vision and pattern recognition workshops. 2015. (Year: 2018).*

Jiang, Wei, and Jinwei Gu. "Video stitching with spatial-temporal content-preserving warping." Proceedings of the IEEE conference on computer vision and pattern recognition workshops. 2015. (Year: 2015).*

Wang, Zhou, Hamid R. Sheikh, and Alan C. Bovik. "Objective video quality assessment." The handbook of video databases: design and applications. vol. 41. Boca Raton: CRC press, 2003. 1041-1078. (Year: 2003).*

Lau, Chun Pong, Yu Hin Lai, and Lok Ming Lui. "Restoration of atmospheric turbulence-distorted images via RPCA and quasiconformal maps." Inverse Problems 35.7 (2019): 074002. (Year: 2019).*

Lee, Sangkeun. "Edge statistics-based image scale ratio and noise strength estimation in DCT-coded images." IEEE Transactions on Consumer Electronics 55.4 (2009): 2139-2144. (Year: 2009).*

International Search Report and Written Opinion of the International Searching Authority dated Oct. 13, 2022 in connection with International Patent Application No. PCT/KR2022/003721, 7 pages.

* cited by examiner

FIG. 1

Blur

Sharp

Blur

Sharp

SYSTEM AND METHOD FOR NOISE REDUCTION FOR BLENDING BLURRED FRAMES IN A MULTI-FRAME SYSTEM

CROSS-REFERENCE TO RELATED APPLICATION AND PRIORITY CLAIM

This application claims priority under 35 U.S.C. § 119(e) to U.S. Provisional Patent Application No. 63/302,359 filed on Jan. 24, 2022, which is hereby incorporated by reference in its entirety.

TECHNICAL FIELD

This disclosure relates generally to imaging systems. More specifically, this disclosure relates to a system and method for noise reduction improvement for blending blurred frames in a multi-frame system.

BACKGROUND

Mobile electronic devices, such as smartphones and tablet computers, have become the most prevalent device type for capturing, uploading, and sharing digital images. In certain camera systems, noise and artifacts may be present in the resulting images. Mobile device cameras often capture and combine multiple image frames in order to provide higher image quality to the user. Example aspects of image quality improvements are noise reduction, scaling artifact reduction in zoom scenarios, high dynamic range, and preservation of fine image details. However, users taking photographs with mobile devices cameras are commonly holding the camera by hand, and even the most careful user inevitably introduces small camera motions due to handshake. When the amount of handshake is high (especially in zoom scenarios), a significant amount of frame blur can be introduced into image frames. Image blur degrades image quality for the end user.

SUMMARY

This disclosure relates to a system and method for noise reduction improvement for blending blurred frames in a multi-frame system.

In a first embodiment, an electronic device includes a display and at least one processor. The at least one processor is configured to retrieve a number of frames of an image. The at least one processor is also configured to identify one or more edges within the frames. The at least one processor is further configured to compare an edge strength of a reference frame and an edge strength of a non-reference frame. The at least one processor is also configured to determine a weight reduction factor based on a result of the comparison. The at least one processor is further configured to apply the weight reduction factor to a blending of multiple frames of the number of frames of the image. In addition, the at least one processor is configured to display the blended frames.

In a second embodiment, a method includes retrieving a number of frames of an image. The method also includes identifying one or more edges within the frames and comparing an edge strength of a reference frame and an edge strength of a non-reference frame. The method further includes determining a weight reduction factor based on a result of the comparison and applying the weight reduction factor to a blending of multiple frames of the number of frames of the image. In addition, the method includes displaying the blended frames.

In a third embodiment, a non-transitory computer readable medium contains instructions that when executed cause at least one processor to retrieve a number of frames of an image and identify one or more edges within the frames. The medium also contains instructions that when executed cause the at least one processor to compare an edge strength of a reference frame and an edge strength of a non-reference frame and determine a weight reduction factor based on a result of the comparison. The medium further contains instructions that when executed cause the at least one processor to apply the weight reduction factor to a blending of multiple frames of the number of frames of the image. In addition, the medium contains instructions that when executed cause the at least one processor to display the blended frames.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a gaming console (such as an XBOX, PLAYSTATION, or NINTENDO), a smart speaker or speaker with an integrated digital assistant (such as SAMSUNG GALAXY HOME, APPLE HOMEPOD, or AMAZON ECHO), an electronic dictionary, an electronic key, a camcorder, or an electronic picture frame.

Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 8, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, mobile electronic devices, such as smartphones and tablet computers, have become the most prevalent device type for capturing, uploading, and sharing digital images. In certain camera systems, noise and artifacts may be present in the resulting images. Mobile device cameras often capture and combine multiple image frames in order to provide higher image quality to the user. Example aspects of image quality improvements are noise reduction, scaling artifact reduction in zoom scenarios, high dynamic range, and preservation of fine image details. However, users taking photographs with mobile devices cameras are commonly holding the camera by hand, and even the most careful user inevitably introduces small camera motions due to handshake. When the amount of handshake is high (especially in zoom scenarios), a significant amount of frame blur can be introduced into image frames. Image blur degrades image quality for the end user.

In some embodiments of this disclosure, a mobile device includes a multi-frame image processing system. An important benefit of multi-frame processing is noise reduction. In an ideal capture environment, every input frame has high quality and can be used in a blending process to reduce noise throughout the scene, preserving detail in the final blended frame. In practical capture environments, handshake introduces camera motion while the input frames are being captured. While many frames have small motion and details are not blurred, some frames can be blurred during capture due to camera motion. When these frames are used in the blending process, details can be blurred in the final output, so one strategy could be to detect blur in the input frames and remove frames that suffer from excessive blur. Blurred details are notoriously difficult to detect when only scene motion detectors are used. The blurred details take on similar values between frames, so common motion detectors do not detect enough change to reduce blending weights. Thus, rejecting a frame avoids blending blurred details into the final output. However, many areas in the frame lack details and would not degrade if the input frame were used. By rejecting the blurry frames, the potential for noise reduction is lost in many parts of the frame.

Certain embodiments of the present disclosure provide an improved system designed to use blurry frames in blending while locally detecting the blur to avoid blurring details in the final blended frame. Blur detection based only on motion detection strategies, such as pixel-level differences, are not effective. Blurring introduces little pixel-level difference, so motion detection does not detect blurred areas well and thus cannot prevent blending due to blurring. Blurring is better detected by measuring changes in edge structure between frames. In areas in which a decrease in edge structure is measured, blending can be reduced. Certain embodiments of this disclosure provide the advantage of maintaining high blending levels where blurring has little effect in order to obtain high noise reduction while blocking blending around edge structures where blending ultimately reduces details. Embodiments of the present disclosure provide a system and method to analyze each input frame and measure the amount of frame blur, selectively blending parts of the blurred frame in order to maintain a high level of multi-frame noise reduction while avoiding blending blurred details.

Figure 1:
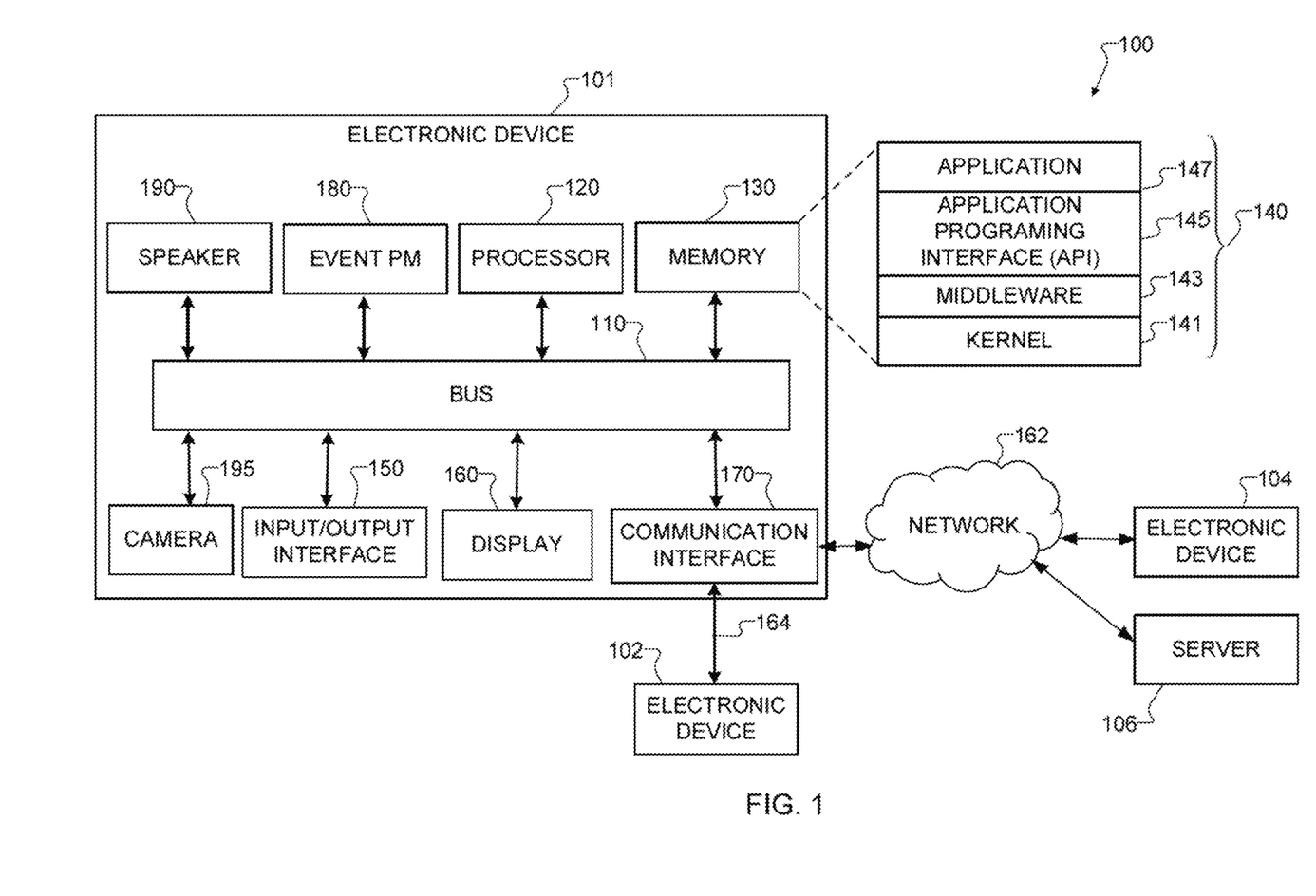
FIG. 1 illustrates an example network configuration including an electronic device in accordance with this disclosure.

FIG. 1 illustrates an example network configuration 100 in accordance with this disclosure. The embodiment of the network configuration 100 shown in FIG. 1 is for illustration only. Other embodiments could be used without departing from the scope of this disclosure. As shown in FIG. 1, according to embodiments of this disclosure, an electronic device 101 is included in the network configuration 100. The electronic device 101 may include at least one of a bus 110, a processor 120, a memory 130, an input/output (I/O) interface 150, a display 160, a communication interface 170, or an event processing module 180. The electronic device 101 may also include a speaker 190 and camera 195. In some embodiments, the electronic device 101 may exclude at least one of the components or may add another component.

The bus 110 may include a circuit for connecting the components 120-180 with one another and transferring communications (such as control messages and/or data) between the components. The processor 120 may include one or more of a central processing unit (CPU), an application processor (AP), or a communication processor (CP). The processor 120 may perform control on at least one of the other components of the electronic device 101 and/or perform an operation or data processing relating to communication.

The memory 130 may include a volatile and/or non-volatile memory. For example, the memory 130 may store commands or data related to at least one other component of the electronic device 101. According to embodiments of this disclosure, the memory 130 may store software and/or a program 140. The program 140 may include, for example, a kernel 141, middleware 143, an application programming interface (API) 145, and/or an application program (or "application") 147. At least a portion of the kernel 141, middleware 143, or API 145 may be denoted an operating system (OS).

The kernel 141 may control or manage system resources (such as the bus 110, processor 120, or memory 130) used to perform operations or functions implemented in other programs (such as the middleware 143, API 145, or application program 147). The kernel 141 may provide an interface that allows the middleware 143, API 145, or application 147 to access the individual components of the electronic device 101 to control or manage the system resources. The middleware 143 may function as a relay to allow the API 145 or the application 147 to communicate data with the kernel 141, for example. A plurality of applications 147 may be provided. The middleware 143 may control work requests received from the applications 147, such as by allocating the priority of using the system resources of the electronic device 101 (such as the bus 110, processor 120, or memory 130) to at least one of the plurality of applications 147. The API 145 is an interface allowing the application 147 to control functions provided from the kernel 141 or the middleware 143. For example, the API 133 may include at least one interface or function (such as a command) for file control, window control, image processing, or text control.

The input/output interface 150 may serve as an interface that may, for example, transfer commands or data input from a user or other external devices to other component(s) of the electronic device 101. Further, the input/output interface 150 may output commands or data received from other component(s) of the electronic device 101 to the user or the other external devices.

The display 160 may include, for example, a liquid crystal display (LCD), a light emitting diode (LED) display, an organic light emitting diode (OLED) display, a microelectromechanical systems (MEMS) display, or an electronic paper display. The display 160 can also be a depth-aware display, such as a multi-focal display. The display 160 may display various contents (such as text, images, videos, icons, or symbols) to the user. The display 160 may include a touchscreen and may receive, for example, a touch, gesture, proximity, or hovering input using an electronic pen or a body portion of the user.

The communication interface 170 may set up communication between the electronic device 101 and an external electronic device (such as a first electronic device 102, a second electronic device 104, or a server 106). For example, the communication interface 170 may be connected with a network 162 or 164 through wireless or wired communication to communicate with the external electronic device.

The first external electronic device 102 or the second external electronic device 104 may be a wearable device or an electronic device 101-mountable wearable device (such as a head mounted display (HMD)). When the electronic device 101 is mounted in an HMD (such as the electronic device 102), the electronic device 101 may detect the mounting in the HMD and operate in a virtual reality mode. When the electronic device 101 is mounted in the electronic device 102 (such as the HMD), the electronic device 101 may communicate with the electronic device 102 through the communication interface 170. The electronic device 101 may be directly connected with the electronic device 102 to communicate with the electronic device 102 without involving with a separate network.

The wireless communication may use at least one of, for example, long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. The wired connection may include at least one of, for example, universal serial bus (USB), high-definition multimedia interface (HDMI), recommended standard 232 (RS-232), or plain old telephone service (POTS). The network 162 may include at least one communication network, such as a computer network (like a local area network (LAN) or wide area network (WAN)), the Internet, or a telephone network.

The first and second external electronic devices 102 and 104 each may be a device of the same type or a different type from the electronic device 101. According to embodiments of this disclosure, the server 106 may include a group of one or more servers. Also, according to embodiments of this disclosure, all or some of the operations executed on the electronic device 101 may be executed on another or multiple other electronic devices (such as the electronic devices 102 and 104 or server 106). Further, according to embodiments of this disclosure, when the electronic device 101 should perform some function or service automatically or at a request, the electronic device 101, instead of executing the function or service on its own or additionally, may request another device (such as electronic devices 102 and 104 or server 106) to perform at least some functions associated therewith. The other electronic device (such as electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

The camera 195 can be configured to capture still or moving images. For example, the camera 195 can capture a single frame or multiple frames. In certain embodiments, the camera 195 is a single camera. In certain embodiments, the camera 195 is an imaging system that includes multiple cameras. In certain embodiments, the camera 195 comprises a camera disposed beneath the display 160, namely an under-display camera (UDC).

While FIG. 1 shows that the electronic device 101 includes the communication interface 170 to communicate with the external electronic device 102 or 104 or server 106 via the network(s) 162 and 164, the electronic device 101 may be independently operated without a separate communication function, according to embodiments of this disclosure. Also, note that the electronic device 102 or 104 or the server 106 could be implemented using a bus, a processor, a memory, a I/O interface, a display, a communication interface, and an event processing module (or any suitable subset thereof) in the same or similar manner as shown for the electronic device 101.

The server 106 may operate to drive the electronic device 101 by performing at least one of the operations (or functions) implemented on the electronic device 101. For example, the server 106 may include an event processing server module (not shown) that may support the event processing module 180 implemented in the electronic device 101. The event processing server module may include at least one of the components of the event processing module 180 and perform (or instead perform) at least one of the operations (or functions) conducted by the event processing module 180. The event processing module 180 may process at least part of the information obtained from other elements (such as the processor 120, memory 130, input/output interface 150, or communication interface 170) and may provide the same to the user in various manners.

In some embodiments, the processor 120 or event processing module 180 is configured to communicate with the server 106 to download or stream multimedia content, such as images, video, or sound. For example, a user operating the electronic device 101 can open an application or website to stream multimedia content. The processor 120 (or event processing module 180) can process and present information, via the display 160, to enable a user to search for content, select content, and view content. In response to the selections by the user, the server 106 can provide the content or record the search, selection, and viewing of the content, or both provide and record.

While the event processing module 180 is shown to be a module separate from the processor 120 in FIG. 1, at least a portion of the event processing module 180 may be included or implemented in the processor 120 or at least one other module, or the overall function of the event processing module 180 may be included or implemented in the processor 120 shown or another processor. The event processing module 180 may perform operations according to embodiments of this disclosure in interoperation with at least one program 140 stored in the memory 130.

Although FIG. 1 illustrates one example of a network configuration 100, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
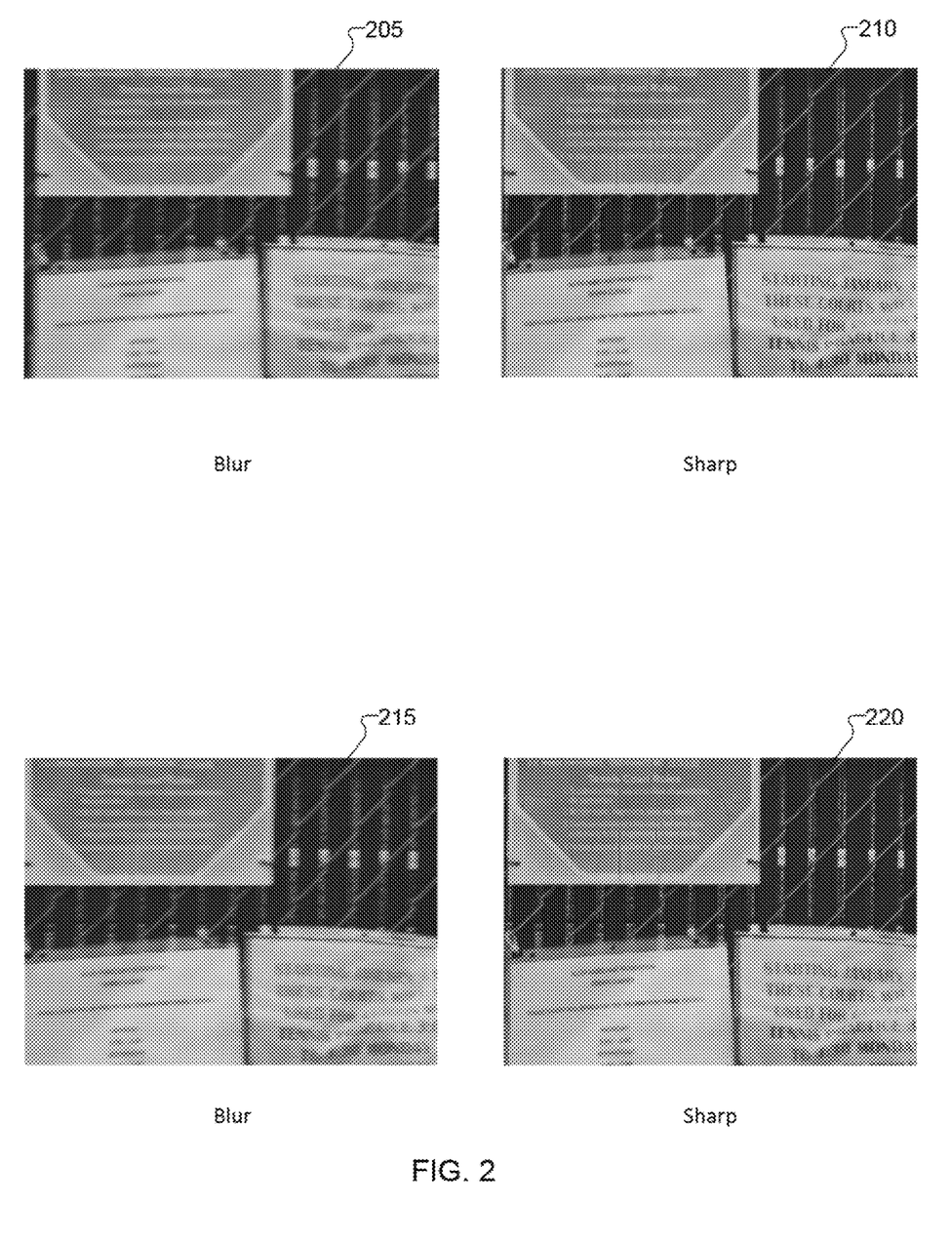
FIG. 2 illustrates examples from image blending in accordance with this disclosure.

FIG. 2 illustrates examples from image blending in accordance with this disclosure. The examples shown in FIG. 2 are for illustration only. Other examples could be used without departing from the scope of the present disclosure. One benefit of multi-frame processing systems is noise reduction. In the ideal case, every frame captured has a strong level of detail. When the frames are blended together, the noise reduction from the blending is captured, and the blended output frame has very low noise. However, in certain instances, a fair amount of camera motion may occur during image capture. The camera motion may blur some of the input frames. Blur may be especially prevalent in a low-light environment when exposure times get longer and in high zoom when a camera motion is magnified.

The blur in the input frames, although usable to reduce noise in areas where there are edges and other details, may reduce the total image quality as a result of blurring out the details. Additionally, it is difficult to detect blurring from conventional motion detectors, which typically search for differences in pixel levels between frames to determine whether a non-reference frame should be blended or not. When the pixel-level difference is low, a blending weight for the non-reference frame is high. When the pixel-level difference is significant or high, the blending weight is reduced, and the reduced blending weight is determined throughout the frame. Therefore, the blending weight adjustment is a very local measure. Blurring near the edge does not significantly change the pixel level. Therefore, it is hard to shut off the blending just because the frame is blurred. As such, the levels will generally be similar enough that the blending weight will still be high, which results in introducing a blur into the final output. Typically, blur is detected at the frame level, and a strongly blurred frame is omitted from being used in blending. Omitting the frame results in loss of noise reduction.

In the example shown in FIG. 2, a camera captures a first frame 205, second frame 210, third frame 215, and fourth frame 220. Due to a movement or shaking of a hand of the user, the first frame 205 and third frame 215 in this example are blurred. When comparing a blurred frame (the first frame 205 or third frame 215) to a sharp frame (the second frame 210 or fourth frame 220), the level of detail loss in the blurry frame is significant when comparing the final output quality.

Embodiments of the present disclosure provide a system and method to blend the frames while avoiding loss of detail. Embodiments of the present disclosure provide a way to measure the amount of blur throughout a frame and then reduce the blending weights due to the detected level of blur. Embodiments of the present disclosure reduce blur around edges in the frame and, in parts of the image where there are no edges, maintain a high blending weight.

Figure 3:
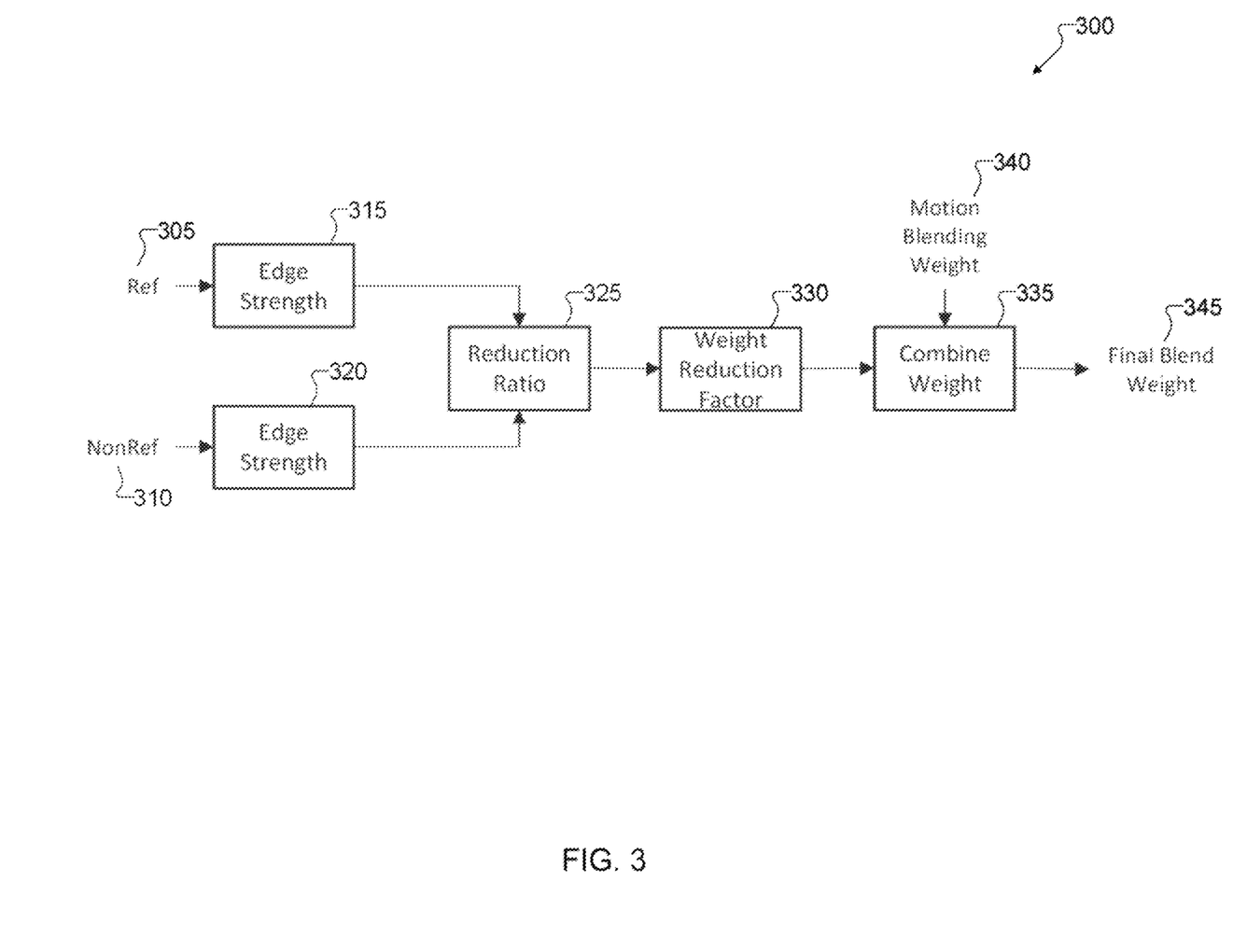
FIG. 3 illustrates an example of an image blending pipeline in accordance with this disclosure.

FIG. 3 illustrates an example of an image blending pipeline 300 in accordance with this disclosure. For ease of explanation, the image blending pipeline 300 may be described as being included in or used by the electronic device 101 in the network configuration 100 of FIG. 1. However, the image blending pipeline 300 may be included in or used by any other suitable device and in any other suitable system, such as a system that includes an imaging system or processes images captured by an imaging system.

In certain embodiments, the mobile device 101 includes a camera 195. The camera 195 is configured to capture one or more frames of an image. For example, the camera 195 can capture one or more still or moving images. The camera 195 delivers the frames of the captured image to a processor, which includes or supports the use of the image blending pipeline 300. The frames of the captured image include a reference (Ref) frame 305 and a non-reference (NonRef) frame 310. The processor used here can represent the processor 120 or can be a different processor coupled directly or indirectly to the processor 120. For instance, the image blending pipeline 300 can be one or more sub-processors within a processing system or one or more modules within the processor.

The image blending pipeline 300 includes one or more blocks or modules for Edge Strength measurement, such as a first Edge Strength module 315 for measuring an edge strength of the Ref frame 305 and a second Edge Strength module 320 for measuring an edge strength of the NonRef frame 310. In certain embodiments, the Edge Strength measurement is performed by a single module that measures edge strength in both reference and non-reference frames. The image blending pipeline 300 further includes one or more blocks or modules including a Reduction Ratio module 325, a Weight Reduction Factor module 330, and a Combine Weight module 335. One or more of the blocks or modules can be implemented in hardware, software, firmware, or a combination of hardware and software/firmware. For example, one or more of the blocks can be implemented in processing circuitry configured to perform the specified functions or configured to execute instructions in an algorithm to perform the specified functions.

The image blending pipeline 300 receives an input set that includes the Ref frame 305 and NonRef frame 310. The Ref frame 305 may be a frame identified as being a sharpest frame among the number of frames of the image captured by the camera 195. That is, in a plurality of frames, the sharpest may be identified as being the Ref frame 305. Thus, in some cases, the Ref frame 305 may be the frame having the most detail. The Ref frame 305 can be defined while the NonRef frame 310 can be any number of remaining frames that are not the Ref frame 305.

The first Edge Strength module 315 measures the edge strength throughout the Ref frame 305, and the second Edge Strength module 320 measures the edge strength throughout the NonRef frame 310. The edge strength measurements from the first Edge Strength module 315 and from the second Edge Strength module 320 are provided to the Reduction Ratio module 325.

The Reduction Ratio module 325 looks for areas where the NonRef frame 310 has a lower edge strength than the Ref frame 305 by computing a reduction ratio. The reduction ratio is a value of the edge strength of the Ref frame 305 divided by a value of the edge strength of the NonRef frame 310. The reduction ratio is provided to Weight Reduction Factor module 330. The Weight Reduction Factor module 330 computes, based on the reduction ratio, a weight reduction factor that indicates how much to reduce the blending at a particular area or pixel(s). In areas where the reduction ratio is high, the weight reduction factor is adjusted so that blending is reduced to be closer to zero. In areas where the reduction ratio is low, the weight reduction factor is set to one and the original blending weight is maintained. The Combine Weight module 335 obtains a motion blending weight 340 and the weight reduction factor from the Weight Reduction Factor module 330. The moving blending weight 340 is based on a comparison of the content and the frames to identify motion areas. The Combine Weight module 335 combines the weight reduction factor with the motion blending weight 340 to produce a final blending weight 345.

Accordingly, the image blending pipeline 300 includes a weight reduction factor. The weight reduction factor is computed to reduce blending weights based on the amount of blur detected compared to a reference frame. In certain embodiments, the image blending pipeline 300 also includes edge and image structure maps, which are used in combination with the weight reduction factor to limit the blending reduction around certain areas of the image, such as around edges where the blur would degrade the image quality during blending.

In certain embodiments, blurred frames are presented to the image blending pipeline 300 to reduce noise in the final blended image. Since, around blurred edges, blurred details should not be blended, the image blending pipeline 300 measures and compares edge strengths between the reference frame 305 and non-reference frame(s) 310. When a reduction in edge strength is detected, the image blending pipeline 300 reduces a blending weight to avoid blurring edges. In certain embodiments, to improve the robustness of the solution, the image blending pipeline 300 sorts local edge strengths from all non-reference frames 310 and uses the sorted local edge strengths to isolate clearly-blurred areas of certain frames. In certain embodiments, the image blending pipeline 300 uses additional edge structure maps to isolate the effects of reduced blending. When used in combination, the image blending pipeline 300 improves noise reduction throughout the entirety of the blended frame while avoiding introducing blur around structured parts of the image.

Figure 4:
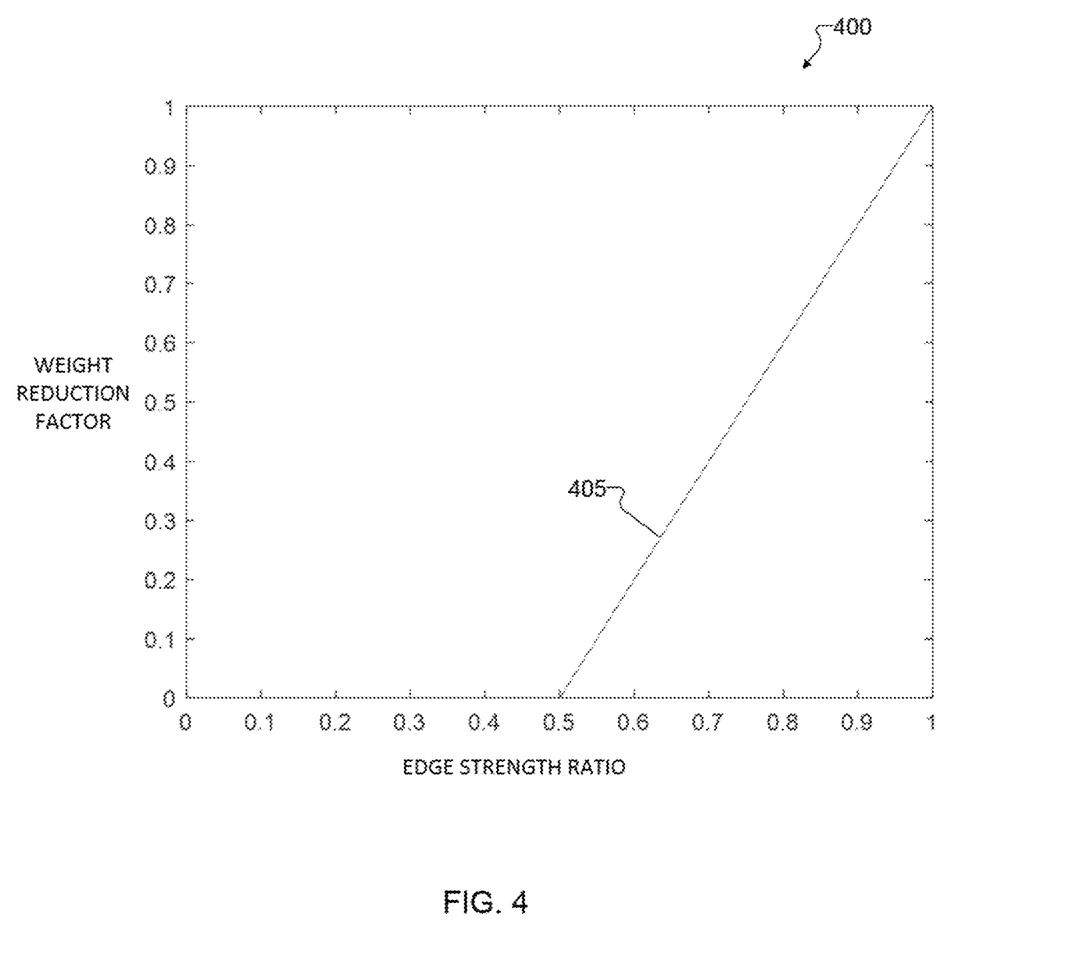
FIG. 4 illustrates an example of a weight reduction factor curve in accordance with this disclosure.

FIG. 4 illustrates an example of a weight reduction factor curve 400 in accordance with this disclosure. The example weight reduction factor curve 400 shown in FIG. 4 is for illustration only. Other examples could be used without departing from the scope of the present disclosure.

In a multi-frame capture application, multiple frames are blended together. Among this set of frames, one frame is chosen and denoted as the reference frame 305. Each other frame is compared to the reference frame 305 to determine at each location a similarity in content. If the content is not similar, a low blending weight is used, such as to avoid ghosting artifacts. If the content is similar, a higher blending weight is used. Blending multiple frames improves image quality by reducing noise and scaling artifacts. However, blurred content can still use a high blending weight when measuring only pixel-level differences to determine similarity.

Embodiments of the image blending pipeline 300 add a measure of blur difference to the definition of similarity. In some cases, this may be accomplished as follows. For each non-reference frame 310, the Edge Strength module 320 in the image blending pipeline 300 measures the edge strength using an edge strength filter at each point in the image. A similar measure is performed on the reference frame 305 by the Edge Strength module 315. These two values are compared, and a significant reduction in the edge strength of the non-reference frame compared to the reference frame indicates the presence of blur. For instance, a reduction in edge strength can be detected by computing the ratio as follows.

$$\text{Ratio}=\text{EdgeStrength}(\text{NonRef})/\text{EdgeStrength}(\text{Ref}) \quad (1)$$

In FIG. 4, the Edge Strength Ratio is shown along the x-axis of the weight reduction factor curve 400, and the WeightReductionFactor is measured off the y-axis. In some cases, the final blend weight to be applied can be determined as follows.

$$\text{FinalBlendWeight}=\text{BlendWeight}*\text{WeightReductionFactor} \quad (2).$$

In the example shown in FIG. 4, when the Edge Strength Ratio is less than 0.5, the WeightReductionFactor 405 is 0. As the Edge Strength Ratio increases from a value of 0.5 to 1, the WeightReductionFactor 405 increase from a value of 0 to 1, respectively. That is, when the Edge Strength Ratio is less than half of the reference (when the edge strength of the non-reference frame 310 is less than half of the edge strength of the reference frame 305), a zero blending rate is applied. As the Edge Strength Ratio approaches one, meaning the edge strength of the non-reference frame 310 is close to matching the edge strength of the reference frame 305, an almost full blending weight is applied. Additionally, when the Edge Strength Ratio is at or near one, meaning that the edge strength of the non-reference frame 310 is the same as the edge strength of the reference frame 305, a full blending weight is applied. At a blending weight of one, the final blend weight is dependent only on the motion analysis-based motion blending weight (BlendWeight).

Figure 5:
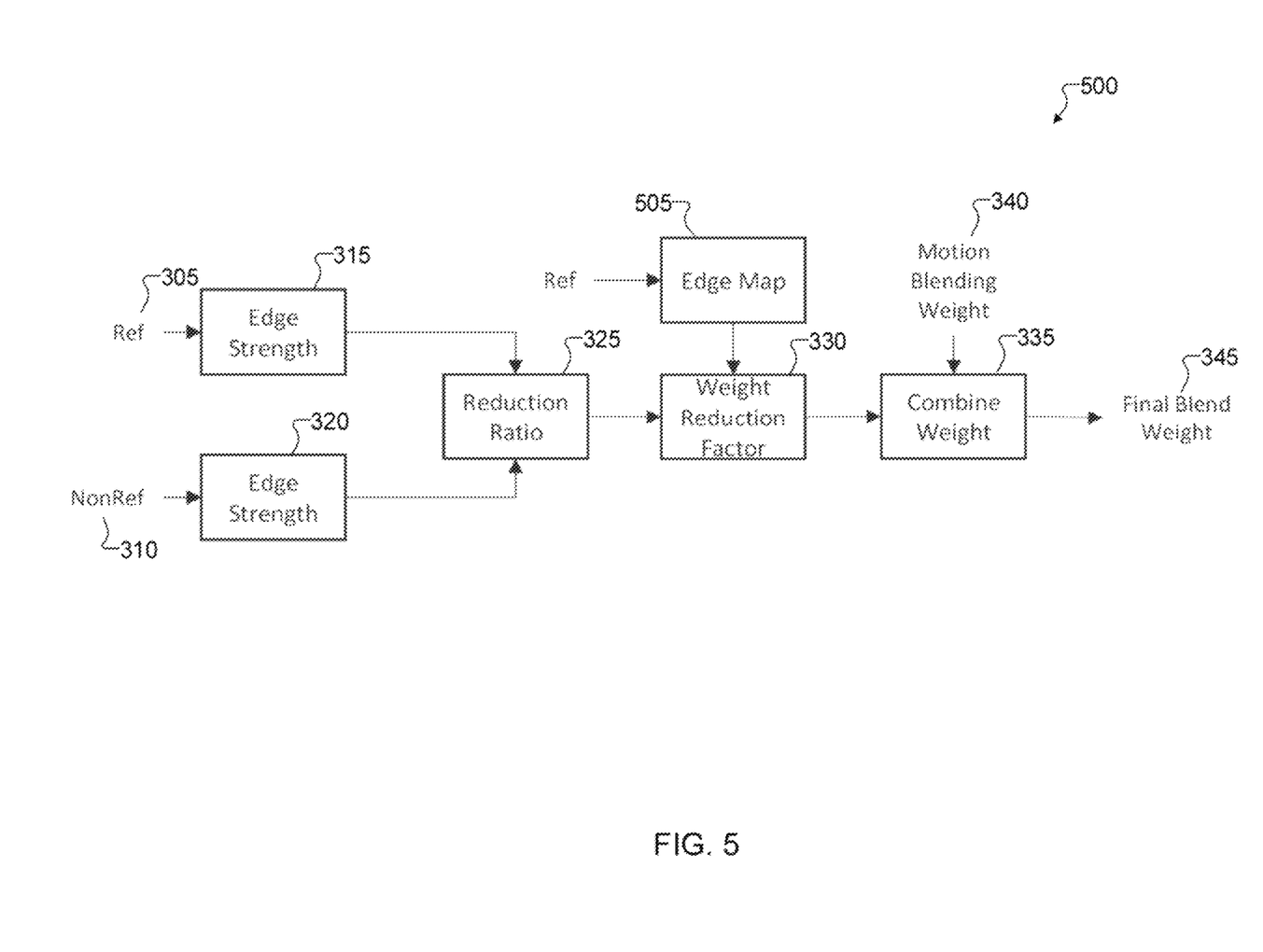
FIG. 5 illustrates another example of an image blending pipeline in accordance with this disclosure.

FIG. 5 illustrates another example of an image blending pipeline 500 in accordance with this disclosure. For ease of explanation, the image blending pipeline 500 may be described as being included in or used by the electronic device 101 in the network configuration 100 of FIG. 1. However, the image blending pipeline 500 may be included in or used by any other suitable device and in any other suitable system, such as a system that includes an imaging system or processes images captured by an imaging system.

In certain embodiments, the image blending pipeline 500 includes one or more edge maps 505 forming part of the image blending pipeline 500. The edge maps 505 are used in combination with the weight reduction factor to limit the blending reduction around areas where blur would degrade image quality. An edge map can be obtained from an edge map operation or from a Canny edge map detector, can be a standard edge map, or can be derived or constructed from the edge strength.

In the example shown in FIG. 5, a camera 195 delivers the frames of the captured image to a processor, which includes the image blending pipeline 500. The frames of the captured image include a reference (Ref) frame 305 and a non-reference (NonRef) frame 310. The processor used here can represent the processor 120 or can be a different processor coupled directly or indirectly to the processor 120. For instance, the image blending pipeline 500 can be one or more sub-processors within a processing system or one or more modules within the processor.

The image blending pipeline 500 includes one or more blocks or modules for Edge Strength measurement, such as a first Edge Strength module 315 for measuring an edge strength of the Ref frame 305 and a second Edge Strength module 320 for measuring an edge strength of the NonRef frame 310. In certain embodiments, the Edge Strength measurement is performed by a single module that measures edge strength in both reference and non-reference frames. The image blending pipeline 500 further includes one or more blocks or modules including a Reduction Ratio module 325, a Weight Reduction Factor module 330, and a Combine Weight module 335. One or more of the blocks or modules can be implemented in hardware, software, firmware, or a combination of hardware and software/firmware. For example, one or more of the blocks can be implemented in processing circuitry configured to perform the specified functions or configured to execute instructions in an algorithm to perform the specified functions.

The image blending pipeline 500 receives an input set that includes the Ref frame 305 and NonRef frame 310. The Ref frame 305 may be a frame identified as being a sharpest frame among the number of frames of the image captured by the camera 195. That is, in a plurality of frames, the sharpest may be identified as being the Ref frame 305. Thus, in some cases, the Ref frame 305 may be the frame having the most detail. The Ref frame 305 can be defined while the NonRef frame 310 can be any number of remaining frames that are not the Ref frame 305.

The first Edge Strength module 315 measures the edge strength throughout the Ref frame 305, and the second Edge Strength module 320 measures the edge strength throughout the NonRef frame 310. The edge strength measurements from the first Edge Strength module 315 and from the second Edge Strength module 320 are provided to the Reduction Ratio module 325.

The Reduction Ratio module 325 looks for areas where the NonRef frame 310 has a lower edge strength than the Ref frame 305 by computing a reduction ratio. The reduction ratio is a value of the edge strength of the Ref frame 305 divided by a value of the edge strength of the NonRef frame 310. The reduction ratio is provided to Weight Reduction Factor module 330. The Weight Reduction Factor module 330 computes, based on the reduction ratio, a weight reduction factor that indicates how much to reduce the blending at a particular area or pixel(s). In areas where the reduction ratio is high, the weight reduction factor is adjusted so that blending is reduced to be closer to zero. In areas where the reduction ratio is low, the weight reduction factor is set to one such that the original blending level is maintained.

The Weight Reduction Factor module 330 is augmented by the edge map 505. The edge map 505, which can be an edge and image structure map, is combined with the weight reduction factor in the Weight Reduction Factor module 330, which further helps isolate blending reduction to areas of the image that would degrade the image quality, such as at edges in the image. In certain embodiments, the loss of edge strength between the non-reference image 310 and reference image 305 is more apparent if attention is applied to where the edges are in the reference frame; and combining the edge map 505 with the weight reduction factor further isolates where this blending reduction can occur. The edge map 505 cleans up some of the noise, and some of these measurements isolate the intended effect to the edges in the image.

Adding an edge map 505 into the image blending pipeline 500 helps isolate the blending weight reduction to parts of the image that would degrade most if additional blurring were blended. In this case, when the edge likelihood is high as measured by the edge map 505, the Weight Reduction Factor module 330 behaves as described previously. When edge likelihood is low, the Weight Reduction Factor module 330 returns a value close to 1.0, and the blending weight is not reduced.

The Combine Weight module 335 obtains a motion blending weight 340 and the weight reduction factor from the Weight Reduction Factor module 330. The moving blending weight 340 is based on a comparison of the content and the frames to identify motion areas. The Combine Weight module 335 combines the weight reduction factor with the motion blending weight 340 to produce a final blending weight 345.

Figure 6A:
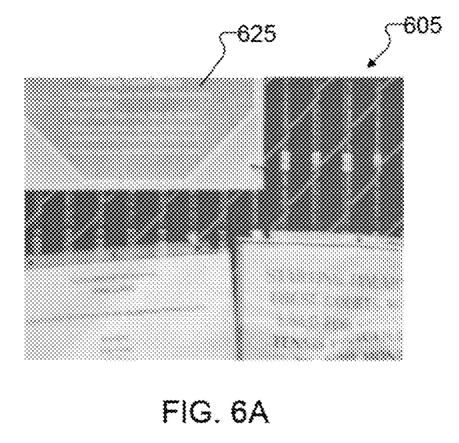
FIGS. 6A through 6D illustrate examples of a blurred imaged and respective edge maps in accordance with this disclosure.
Figure 6B:
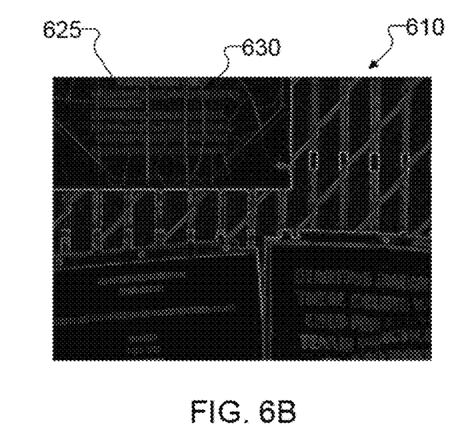
Figure 6C:
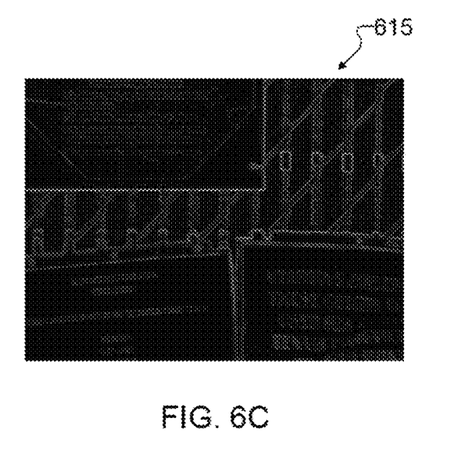

FIGS. 6A through 6C illustrate examples of a blurred imaged and respective edge maps in accordance with this disclosure. The examples shown in FIGS. 6A, 6B, and 6C are for illustration only. Other examples could be used without departing from the scope of the present disclosure. The examples shown in FIGS. 6A-6C illustrate sample edge map non-reference comparisons. More specifically, FIG. 6A illustrates a blurred non-reference frame 605, FIG. 6B illustrates a reference edge map 610, FIG. 6C illustrates a non-reference edge map 615, and FIG. 6D illustrates an example weight reduction factor 620.

In the example shown in FIG. 6A, the non-reference frame 605 includes a sign 625 within an object. Around the sign 625, the edge map 610 still shows a significant level of energy 630 around the text, indicating that there are strong gradient energies or strong edges present. In contrast, in the non-reference edge map 615, the text from the sign 625 is hard to identify because there is not a lot of gradient energy showing up in the non-reference edge map 615. The same applies to the lower two signs shown in the non-reference frame 605. The gradient magnitudes for the lower two signs are reduced quite a lot in the non-reference edge map 615 as compared to the reference edge map 610. If the non-reference frame 605 is blended without considering this, a fair amount of blur would be added to the final blended image by pulling in the blurred non-reference frame 605.

Figure 6D:
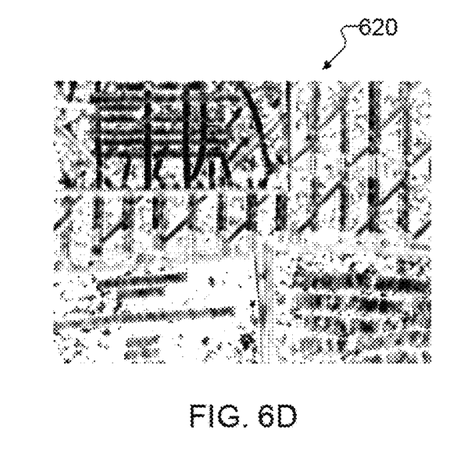

The sample map in FIG. 6D shows light and dark regions in the example weight reduction factor 620. The dark regions of the example weight reduction factor 620 correspond to the interesting parts of the image, such as the text of the signs and the edges of the fence patterns (from the original non-reference frame 605). The dark areas further correspond to where a reduction of blending of the non-reference frame 605 is desired to avoid giving a blurred look to the final image.

Figure 7A:
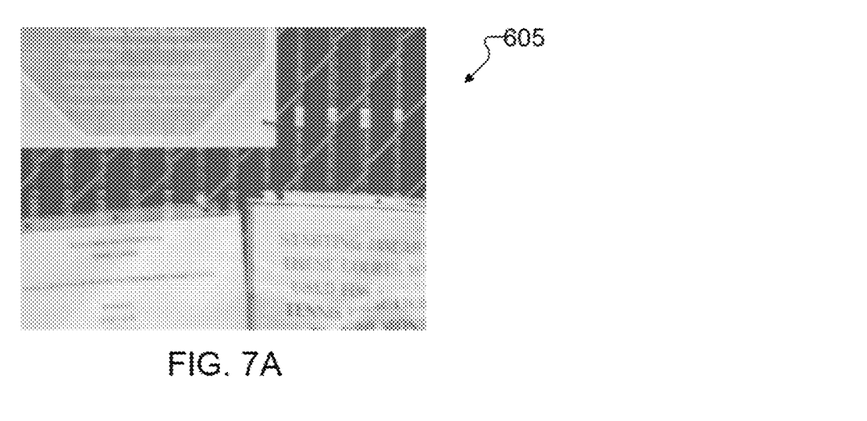
FIGS. 7A through 7C illustrate example results of a blending process on a blurred image in accordance with this disclosure.
Figure 7B:
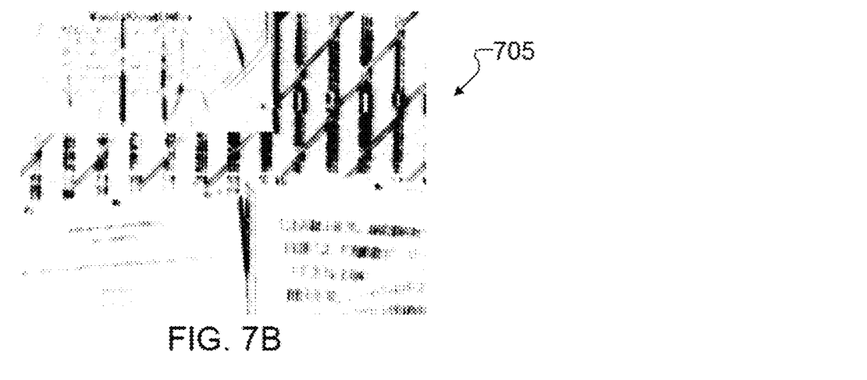
Figure 7C:
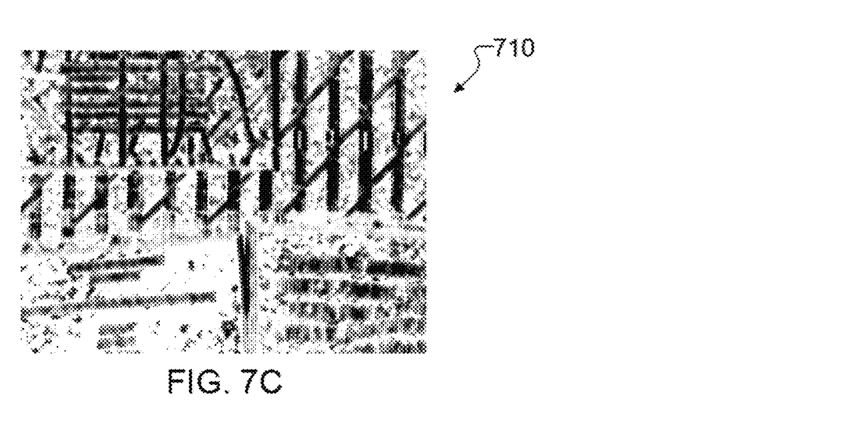

FIGS. 7A through 7C illustrates example results of a blending process on a blurred image in accordance with this disclosure. The examples shown in FIGS. 7A, 7B, and 7C are for illustration only. Other examples could be used without departing from the scope of the present disclosure. The examples shown in FIGS. 7A-7C illustrate combining maps. More specifically, FIG. 7A illustrates the blurred non-reference frame 605, FIG. 7B illustrates an original blend map 705, and FIG. 7C illustrates a reduced blend map 710.

If an original motion map is combined to produce the original blend map 705, combination with the weight reduction factor produces the reduced blend map 710. The combination to produce the reduce blend map 710 avoids the blur in the text areas in the structured parts of the image in the non-reference frame 605. In certain embodiments, reducing blending weight based on measured edge strength involves locally sorting the edge strengths of the frames in increasing order and assigning a weight reduction formula based on the edge strength range measured across the set of frames. This would have the effect of making the system more robust. Locally sorting the edge strength of each frame can involve (1) measuring the edge strength in each input frame, (2) rank ordering each location of edge strength, (3) measuring the range of edge strengths across all input frames at each location, (4) setting weight reduction curve parameters based on range. For example, a small range does not reduce weight for any frame, while a single outlier frame might reduce weight all the way to zero.

Figure 8:
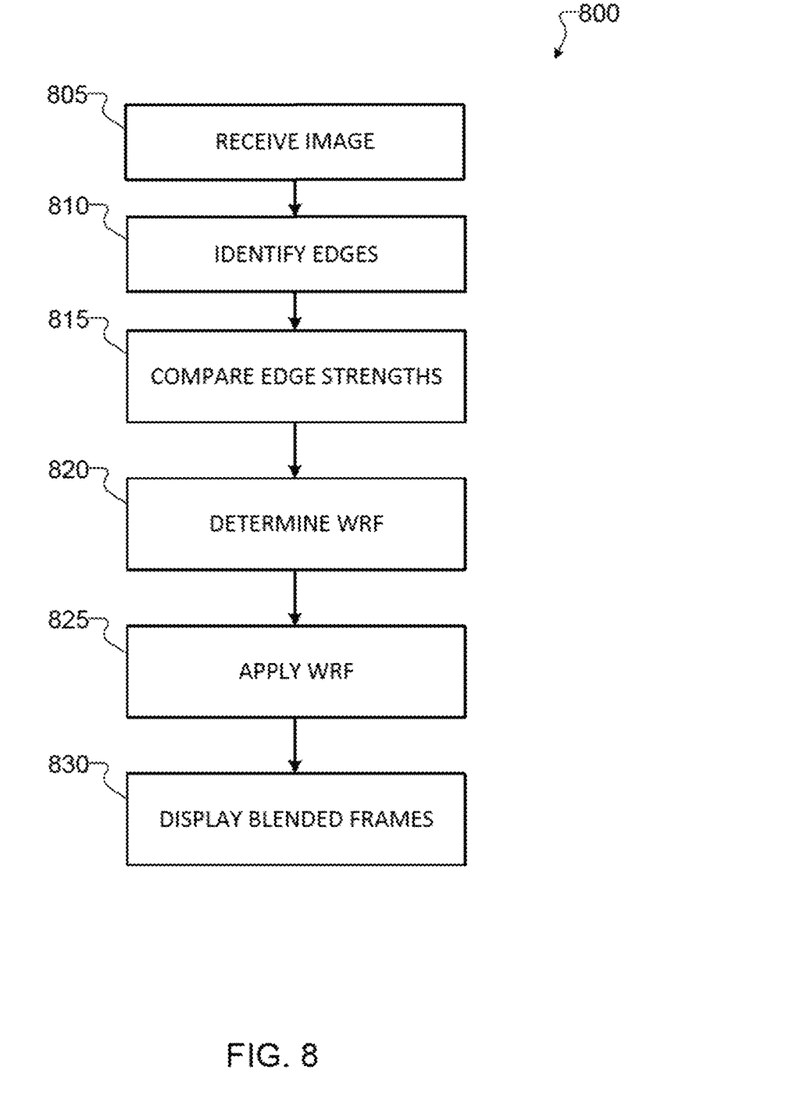
FIG. 8 illustrates an example process for image blending in accordance with this disclosure.

FIG. 8 illustrates an example process 800 for image blending in accordance with this disclosure. While FIG. 8 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process 800 depicted can be implemented by one or more processors in an image processing system, such as by one or more processors 120 of an electronic device 101. In some embodiments, one or more steps of the process 800 are performed by one or more processors in an electronic device performing a machine learning (i.e., an artificial intelligence) process.

In operation 805, the image blending pipeline receives an input set that includes the Ref frame 305 and NonRef frame 310. In operation 810, the image blending pipeline measures the edge strengths throughout the Ref frame 305 and the NonRef frame 310. In operation 815, the edge strength measurements for the Ref frame 305 and the NonRef frame 310 are compared, and a reduction ratio is calculated. The Reduction Ratio is a value of the edge strength of the Ref frame 305 divided by a value of the edge strength of the NonRef frame 310. In operation 820, a weight reduction factor (WRF) is determined and applied in operation 825. In areas where the reduction ratio is high, the weight reduction factor can be adjusted so that blending is reduced to be closer to zero. In areas where the reduction ratio is low, the weight reduction factor can be maintained, such as at a maximum blending level. A motion blending weight is combined with the WRF to produce a final blending weight 345. Thereafter, the final image can be displayed in operation 830

While the above detailed diagrams have shown, described, and pointed out novel features of the invention as applied to various embodiments, it will be understood that various omissions, substitutions, and changes in the form and details of the device or process illustrated may be made by those skilled in the art without departing from the invention. This description is in no way meant to be limiting, but rather should be taken as illustrative of the general principles of the invention.

Although this disclosure has been described with example embodiments, various changes and modifications may be suggested to one skilled in the art. It is intended that this disclosure encompass such changes and modifications as fall within the scope of the appended claims.

What is claimed is:

1. An electronic device comprising:
a display; and
at least one processor configured to:
   obtain a number of image frames;
   determine a sharpest image frame from among the number of image frames, wherein the sharpest image frame is a most detailed image frame from among the number of image frames;
   identify the sharpest image frame as a reference frame;
   identify one or more edges within the image frames;
   divide an edge strength of the reference frame by an edge strength of a non-reference frame to determine a reduction ratio;
   determine a weight reduction factor based on the reduction ratio;
   apply the weight reduction factor to a blending of multiple image frames of the number of image frames; and
   initiate display of the blended image frames.

2. The electronic device of claim 1, wherein the weight reduction factor indicates how much to reduce the blending at a particular area or pixel.

3. The electronic device of claim 1, wherein the at least one processor is configured to reduce a blending rate of the weight reduction factor in response to a smaller reduction ratio.

4. The electronic device of claim 1, wherein the at least one processor is configured to increase a blending rate of the weight reduction factor in response to a larger reduction ratio.

5. The electronic device of claim 1, wherein the at least one processor is further configured to:
   obtain and apply edge and image structure maps; and
   combine the edge and image structure maps with the weight reduction factor to limit a blending reduction around areas where blur would degrade image quality.

6. The electronic device of claim 1, wherein the at least one processor is configured to:
   measure an edge strength at each point in the reference frame and the non-reference frame to respectively obtain the edge strength of the reference frame and the edge strength of the non-reference frame;
   rank order each location of the edge strength;
   measure a range of the edge strengths across all of the image frames at each location; and
   set weight reduction curve parameters based on the range.

7. The electronic device of claim 1, wherein the at least one processor is configured to obtain the number of image frames from a server.

8. A method comprising:
obtaining a number of image frames;
determining a sharpest image frame from among the number of image frames, wherein the sharpest image frame is a most detailed image frame from among the number of image frames;
identifying the sharpest image frame as a reference frame;
identifying one or more edges within the image frames;
dividing an edge strength of the reference frame by an edge strength of a non-reference frame to determine a reduction ratio;
determining a weight reduction factor based on the reduction ratio;

applying the weight reduction factor to a blending of multiple image frames of the number of image frames; and displaying the blended image frames.

9. The method of claim 8, wherein the weight reduction factor indicates how much to reduce the blending at a particular area or pixel.

10. The method of claim 8, wherein a blending rate of the weight reduction factor is reduced in response to a smaller reduction ratio.

11. The method of claim 8, wherein a blending rate of the weight reduction factor is increased in response to a larger reduction ratio.

12. The method of claim 8, further comprising:
obtaining and apply edge and image structure maps; and
combining the edge and image structure maps with the weight reduction factor to limit a blending reduction around areas where blur would degrade image quality.

13. The method of claim 8, further comprising:
measuring an edge strength at each point in the reference frame and the non-reference frame to respectively obtain the edge strength of the reference frame and the edge strength of the non-reference frame;
rank ordering each location of the edge strength;
measuring a range of the edge strengths across all of the image frames at each location; and
setting weight reduction curve parameters based on the range.

14. The method of claim 8, wherein obtaining the number of image frames comprises obtaining the number of image frames from a server.

15. A non-transitory machine-readable medium containing instructions that, when executed by at least one processor of an electronic device, cause the at least one processor to:
obtain a number of image frames;
determine a sharpest image frame from among the number of image frames, wherein the sharpest image frame is a most detailed image frame from among the number of image frames;
identify the sharpest image frame as a reference frame;
identify one or more edges within the image frames;
divide an edge strength of the reference frame by an edge strength of a non-reference frame to determine a reduction ratio;
determine a weight reduction factor based on the reduction ratio;
apply the weight reduction factor to a blending of multiple image frames of the number of image frames; and
initiate display of the blended image frames.

16. The non-transitory machine-readable medium of claim 15, wherein the weight reduction factor indicates how much to reduce the blending at a particular area or pixel.

17. The non-transitory machine-readable medium of claim 15, wherein the instructions when executed cause the at least one processor to:
reduce a blending rate of the weight reduction factor in response to a smaller reduction ratio; and
increase the blending rate of the weight reduction factor in response to a larger reduction ratio.

18. The non-transitory machine-readable medium of claim 17, further containing instructions that when executed cause the at least one processor to:
obtain and apply edge and image structure maps; and
combine the edge and image structure maps with the weight reduction factor to limit a blending reduction around areas where blur would degrade image quality.

19. The non-transitory machine-readable medium of claim 15, further containing instructions that when executed cause the at least one processor to:
measure an edge strength at each point in the reference frame and the non-reference frame to respectively obtain the edge strength of the reference frame and the edge strength of the non-reference frame;
rank order each location of the edge strength;
measure a range of the edge strengths across all of the image frames at each location; and
set weight reduction curve parameters based on the range.

20. The non-transitory machine-readable medium of claim 15, wherein the instructions when executed cause the at least one processor to obtain the number of image frames from a server.

* * * * *